United States Patent [19]

Bell et al.

[11] Patent Number: 5,232,560
[45] Date of Patent: Aug. 3, 1993

[54] ELECTROPOLYMERIZATION METHOD

[76] Inventors: James P. Bell, 34 Farmstead Rd.; Jude O. Iroh, Grad. Dom. J208, Box 236, Whitney Rd. Extension, both of Storrs, Conn. 06268; D. Scola, 83 Stone Post Rd., Glastonbury, Conn. 06033

[21] Appl. No.: 898,911

[22] Filed: Jun. 12, 1992

Related U.S. Application Data

[63] Continuation of Ser. No. 366,933, Jun. 16, 1989, abandoned.

[51] Int. Cl.$^5$ ............................................. C25B 3/00
[52] U.S. Cl. .................................. 204/72; 204/59 R; 523/215
[58] Field of Search ................. 204/59 R, 72; 523/215

[56] References Cited

U.S. PATENT DOCUMENTS

| | | | |
|---|---|---|---|
| 4,559,112 | 12/1985 | Tamamura et al. | 204/59 R |
| 4,933,053 | 6/1990 | Tieke | 204/59 R |

OTHER PUBLICATIONS

Subramamian, R. V. et al., "Electropolymerization on Graphite Fibers", Polymer Eng. & Science, vol. 18, No. 7, May 1978, pp. 590–600.

Bell, J. P. et al., "Application of Ductile Polymeric Coatings Onto Graphite Fibers", Polymer Composites, Feb. 1987, vol. 8, No. 1, pp. 46–52.

*Primary Examiner*—John Niebling
*Assistant Examiner*—Kishor Mayekar
*Attorney, Agent, or Firm*—Fishman, Dionne & Cantor

[57] ABSTRACT

In accordance with the present invention, electropolymerization in a substantially aqueous solution is used to form thick (e.g. greater than 2 microns or 30 weight %) and thermally stable coatings of thermoplastic materials onto electrically conductive filler materials (e.g. rods, plates, fibers). In a preferred embodiment, the thick thermoplastic matrix comprises a copolymer of 3-carboxyphenyl maleimide and styrene. This invention is particularly well suited for direct preparation of thermoplastic prepregs containing commercially available bundles of graphite fibers. These prepregs are then molded under heat and pressure so as to form a thermoplastic matrix composite with good fiber distribution, uniformity and high temperature resistance.

11 Claims, 5 Drawing Sheets

ELECTROPOLYMERIZATION METHOD

This is a continuation of copending application Ser. No. 07/366,933 filed on Jun. 16, 1989 now abandoned.

BACKGROUND OF THE INVENTION

This invention relates to a method of forming thermoplastic composites using electro-polymerization in a predominately aqueous solution. More particularly, this invention relates to the formation of thick and thermally stable uniform coatings of thermoplastic materials on tot he surface of conductive filler materials. This invention specifically relates to the formation of a copolymer of 3-carboxyphenyl maleimide and styrene as a thick coating on a suitable conductive material such as graphite fibers using electro copolymerization techniques.

High performance resins with a good long term environmental stability over a wide range of temperature and with damage tolerance are currently in great demand, particularly in aerospace applications. These resins are typically needed in the manufacture of composite materials which require the properties of high strength and low weight. Thermosetting resins such as epoxy systems are the most widely used matrix resins for such advanced composites. Unfortunately, they generally posses insufficient hot/wet properties and temperature resistance. An exception to this generality is bismaleimide polymers since they are stable at elevated temperature (approximately 200° C.) and have good hot/wet properties. The problem with such systems is that the processing times are relatively long and there is no resin flow after the cure reaction is completed. Greater toughness and impact resistance are also highly desirable.

These problems have heightened the search for alternative thermoplastic materials for use as matrices for advanced composites. Advantageous features of thermoplastic matrices include high toughness, easy processibility, long shelf life and potential for high volume processing resulting in low cost per part. However, the difficulty in preparation of prepregs from high viscosity thermoplastic resins and the problem of wetting all the individual fibers in a fiber bundle as well as the problem associated with polymer solubility and solvent removal limit the efficacy of use of thermoplastics in advanced composites.

Electropolymerization has been used in the direction formation of polymers onto electrode surfaces such as graphite fibers. Such polymerizations have generally been from non-aqueous solutions, by ionic or mixed ionic-radical mechanism. However, molecular weights of the electropolymers from these solutions have generally been low.

More recently, aqueous solution electropolymerization techniques have been disclosed to apply thin (less than ten (10) weight % polymer) polymeric coating onto graphite fibers. See Bell et al, *Polymer Composites*, 8,46 (1987), Subramanian et al, *Polymer Engr. Sci.*, 18,590 (1978). Unfortunately, such thin deposition of thermoplastic polymers onto graphite fibers does not satisfy the need for new thermoplastic composite materials since the thin coatings are incapable of forming the required thick thermoplastic matrix needed in such composites.

SUMMARY OF THE INVENTION

The above-discussed and other problems and deficiencies of the prior art are overcome or alleviated by the electropolymerization method and composite product of the present invention. In accordance with the present invention, electropolymerization in a substantially aqueous solution is used to form thick (e.g. greater than 2 microns or 30 weight %) and thermally stable coatings of thermoplastic materials onto electrically conductive materials (e.g. rods, plates, fibers).

In a preferred embodiment, the thick thermoplastic matrix comprises a copolymer of 3-carboxyphenyl maleimide (3-CMI) and styrene. Also disclosed are thermoplastic matrices comprised of glycidyl acrylate/-methyl acrylate copolymer as well as certain other thermoplastic polymers and copolymers.

This invention is particularly well suited for direct preparation of thermoplastic prepregs containing commercially available bundles of graphite fibers. These prepregs are then molded under heat and pressure so as to form a thermoplastic matrix composite with good fiber distribution, uniformity and high temperature resistance. This final product is a marked improvement over prior art methods of forming thermoplastic composites due to the highly viscous nature of thermoplastic resins which made uniform flow into fiber bundles and wetting of the individual fibers extremely difficult. The method of this invention is also a marked improvement over prior art solvent coating processes which have met limited success because high temperature engineering thermoplastics have very low solubility and because removal and handling of the required exotic solvents is problematic.

The thick coatings (greater than thirty (30) weight %) obtained using the process of the present invention are surprising and unexpected because thermoplastics are good electrical insulators and as the coating layer builds, one would expect the reaction to slow and eventually end due to electrical resistance. Thus, the present invention was unexpected despite the disclosures described above regarding the formation of thin (less than ten (10) weight %) coatings.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
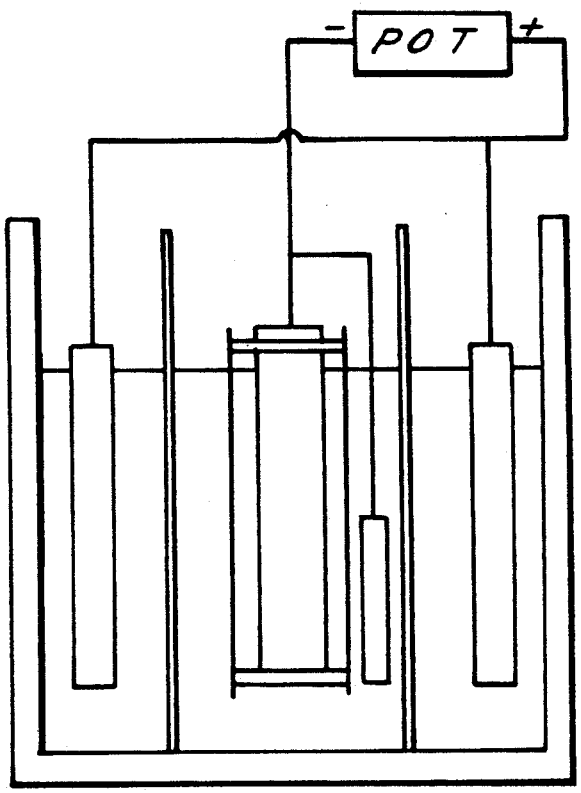
FIG. 1 is a schematic representation of an electrochemical cell.

This invention relates to a process of forming polymer matrix composites wherein the polymer matrix is a thermoplastic and the composite filler includes at least one electrically conductive filler such as graphite. The process utilizes the technique of electropolymerization of thermoplastic monomers in a substantially aqueous solution to form thick and uniform coatings of greater than about two (2) microns or greater than about 30 weight percent polymer coating.

An important feature of this invention is the inclusion of a small amount of organic solvent in the aqueous solution. The organic solvent may include, for example, dimethylacetamide, dimethylsulfoxide, tetrahydrofuran or dimethylformamide. The aqueous solution preferably includes sulfuric acid as an electrolyte although other electrolytes such as ascetic acid may be used.

The monomers used in conjunction with the present invention include any unsaturated monomer that is moderately soluble in an aqueous/organic system and is permeable t the ions diffusing in the electro-chemical process. Such monomers include, but are not limited to hydroxymethylmethacrylate, vinyl carbazole, not limited to hydroxymethylmethacrylate, vinyl carbazole, maleimide, N-ethylmaleimide, 3-carboxyphenyl maleimide, styrene, bismaleimide, cyclohexane, cyclopentadiene, N-phenyl nadimide, and acetylene terminated monomers.

The thermoplastic monomers are electropolymerized onto any suitable electrically conductive material including but not limited to graphite or metal plates, rods, fibers, particles, metal or graphite coated fibers or woven or non-woven conductive webs.

The present invention will now be more particularly described with respect to the formation of thermoplastic matrix composites formed by the electropolymerization of styrene/3-carboxyphenyl maleimide copolymer, glycidyl acrylate/methyl acrylate copolymers and a plurality of other polymer and copolymer composites onto graphite fiber bundles. However, it will be appreciated that the present invention is not limited to these particular polymer and copolymer composites and generally includes the electropolymerized formation of thermoplastic matrix composites wherein the filler includes electrically conductive material such as metal plates, rods, fibers, particles and the like as described above.

As described more fully in the following example, a novel copolymer of styrene and 3-carboxyphenyl maleimide (3-CMI) exhibiting an alternating structure shown below is derived from the method of the present invention;

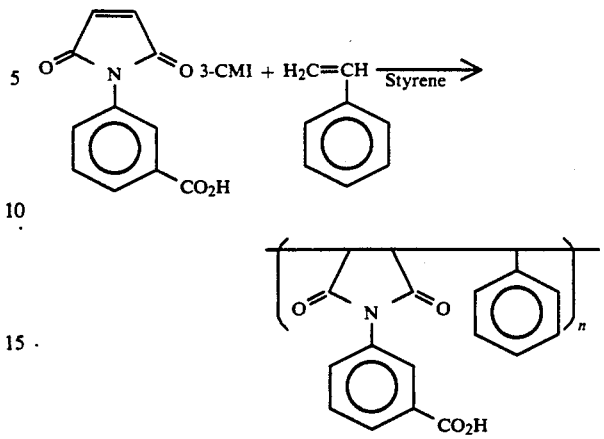

where n is greater than 25.

EXAMPLE 1

Materials

Monometric styrene (99.9%) purchased from Aldrich Chemical Company, was extracted twice in 10% sodium hydroxide solution to remove inhibitor and washed twice in distilled water. 3-Carboxyphenyl maleimide (3-CMI), was purchased from Mitsui Toatsu Chemicals, Inc., of Japan and was used as received. Laboratory grade sulfuric acid, 96% from May and Baker Ltd., was diluted to 0.0125 M by adding distilled water and was then used as the supporting electrolyte. High purity dimethylacetamide (DMAc) (99.9%) was used as purchased from Aldrich Chemical Company. Unsized AS-4 graphite fibers (7.2 micron diameter, 3000 filament bundle) from Hercules Inc., wound onto an H-shaped 6"×6" aluminum frame was used as the working electrode.

Electrocopolymerization

Electrocopolymerization of 3-carboxyphenyl maleimide and styrene was carried out in the middle compartment of a 3-chamber polypropylene cell. A schematic representation of the cell is shown in FIG. 1 wherein Item 1 is the working electrode, Item 2 is the counter electrode, Item 3 is the Standard Calomel (SCE) reference electrode and Item 4 is a polypropylene membrane. The central compartment contains the monomer-electrolyte solution, composed of 3-carboxyphenyl maleimide (0.5 M), styrene (0.5 M), DMAc and sulfuric acid (0.0125 M) in the volume ratio 50:50:20:100. It is separated from the two side compartments by a polypropylene membrane (0.04 micron pore diameter), glued to perforated polypropylene sheets. The side chambers contain the supporting electrolyte and two rectangular stainless steel (8"× 8×1/16") counter electrodes. Other counter electrodes may also be used. Initiation of copolymerization was achieved by constant current polymerization. The current density applied ranged from 2-35 milliamperes and the electrocopolymerization time was varied to give the thickness of coating desired. Electropolymerized materials precipitated onto the surfaces of the graphite fiber cathode and were removed by withdrawing the frames from the cell. The coated fibers were rinsed in distilled water, dried at 200° C. for 12 hours under vacuum and weighed to determine the amount of copolymer formed. It was found that 12 hours at 200° C. under vacuum was sufficient to bring the prepregs to constant weight. The molecular weight distribution of the copolymer synthesized from a 0.5 M (1:1) comonomer feed solution was determined by Waters gel permeation chromatograph. Tetrahydrofuran (THF), and monodispersed polystryene were the solvent and calibration standards respectively.

Characterization

Thermal analysis of the copolymer was accomplished on a duPont 9900 series differential scanning calorimeter and thermogravimetric analyzer operated at 10° C./min under a nitrogen atmosphere. Functional group and copolymer compositional analysis was done by use of Nicolet FTIR spectrophotometer. KBr pellets were used. For calculation of the copolymer composition, a calibration curve for imide (1710 $CM^{-1}$) to styrene (2923 $CM^{-1}$) peak are absorption ratio against the imide-styrene mole composition was constructed, using blends of bulk polymerized polystryene and poly(3-carboxyphenyl maleimide).

Results and Discussion

Aspects of Electrocopolymerization

Figure 2:
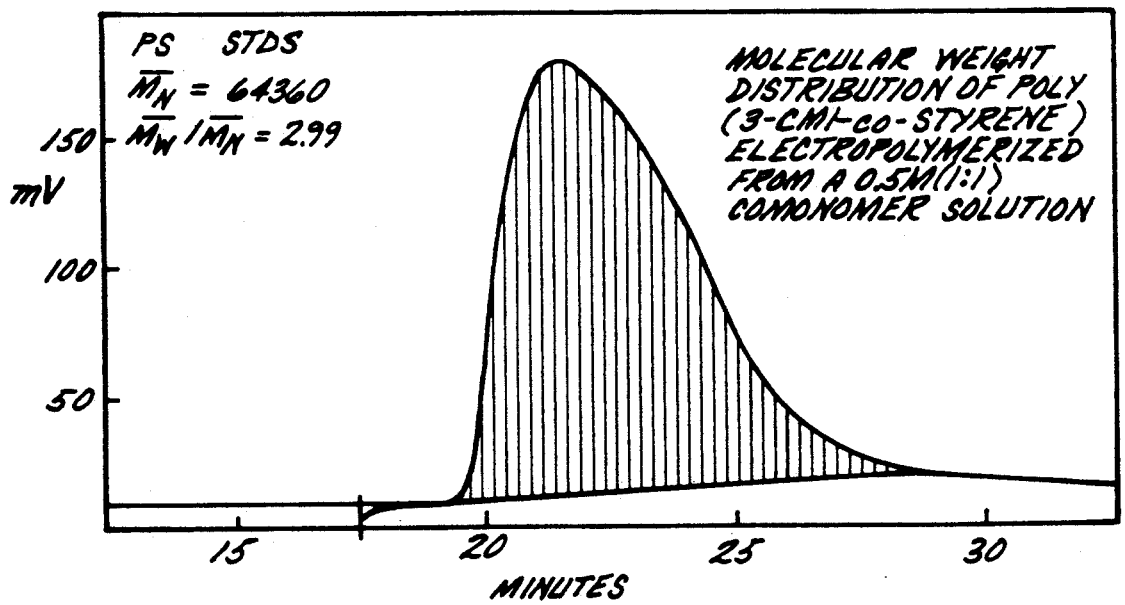
FIG. 2 is a graph showing molecular weight distribution of poly(3-CMI-co-Styrene) electrocopolymerized from a 0.5 M (1:1) comonomer solution.

Neither of the individual comonomers would homopolymerize without current flow under the experimental conditions adopted. Also copolymerization did not take place without current. However, when a current density of about 10 mA per gram of fiber was passed through a solution of styrene (0.5 M), 3-CMI (0.5 M), DMAc and sulfuric acid (0.0125 M), present in the volume ratio 50:50:20:100, respectively, copolymer coatings on the graphite fiber cathode surface occurred almost immediately. A preliminary molecular weight estimate (FIG. 2) indicates a polydispersity index $\overline{Mw}/\overline{Mn}=3$ and a moderately high number average molecular weight, $\overline{Mn}=64000$, consistent with radical copolymerization. The molecular weight is an estimate only, since it was assumed that the same calibration was applicable for the copolymer as for a series of known polystyrene calibration standards.

Thermal Analysis

Figure 3:
FIG. 3 is a DSC thermogram of electropolymerized (1:1) copolymer.
Figure 4:
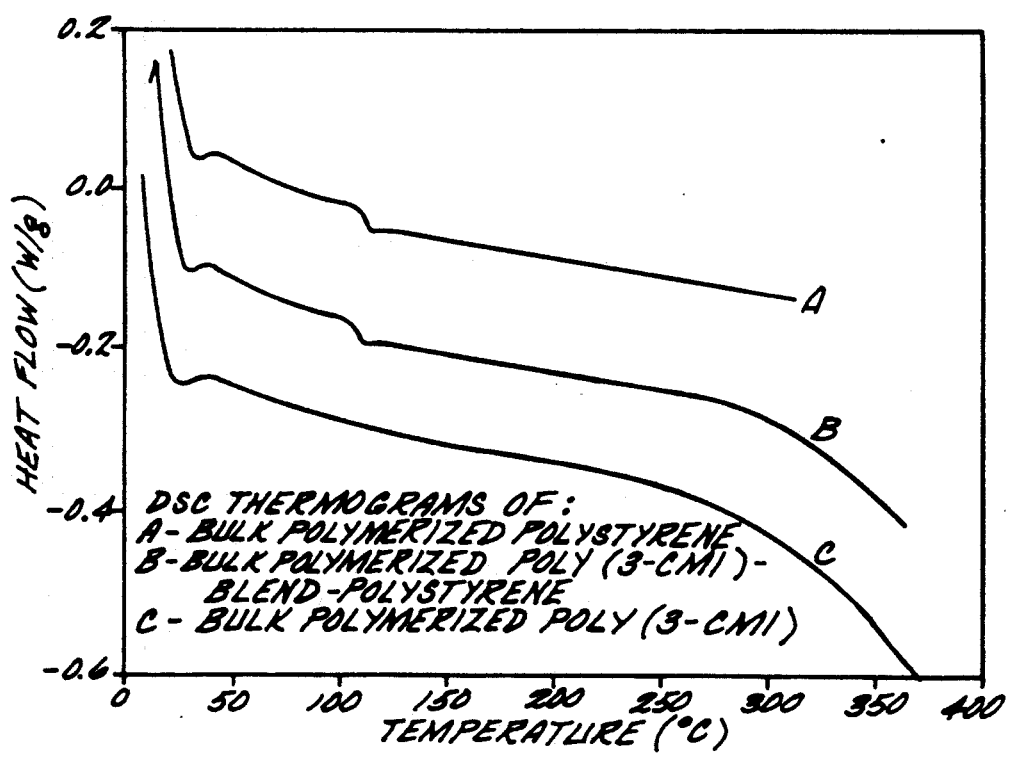
FIG. 4 are DSC thermograms of: A) bulk polymerized polystyrene, B) bulk polymerized poly(3-CMI)-blend-polystyrene, C) bulk polymerized poly(3-CMI)

FIG. 3 shows a typical DSC thermogram of the copolymer synthesized from a 0.5 M(1:1)comonomer feed solution. Variation of the glass transition temperature of copolymers made using different styrene comonomer feed compositions is shown in Table 1. the electrocopolymerized samples show only one glass transition temperature, (e.g., approximately 210° C.) which remained relatively unchanged for samples synthesized from different comonomer feed composition. The DSC thermograms for free radical bulk polymerized polystyrene, poly(3-CMI), and a 1:1 poly(styrene-blend-3-CMI) are shown on FIG. 4.

Figure 5:
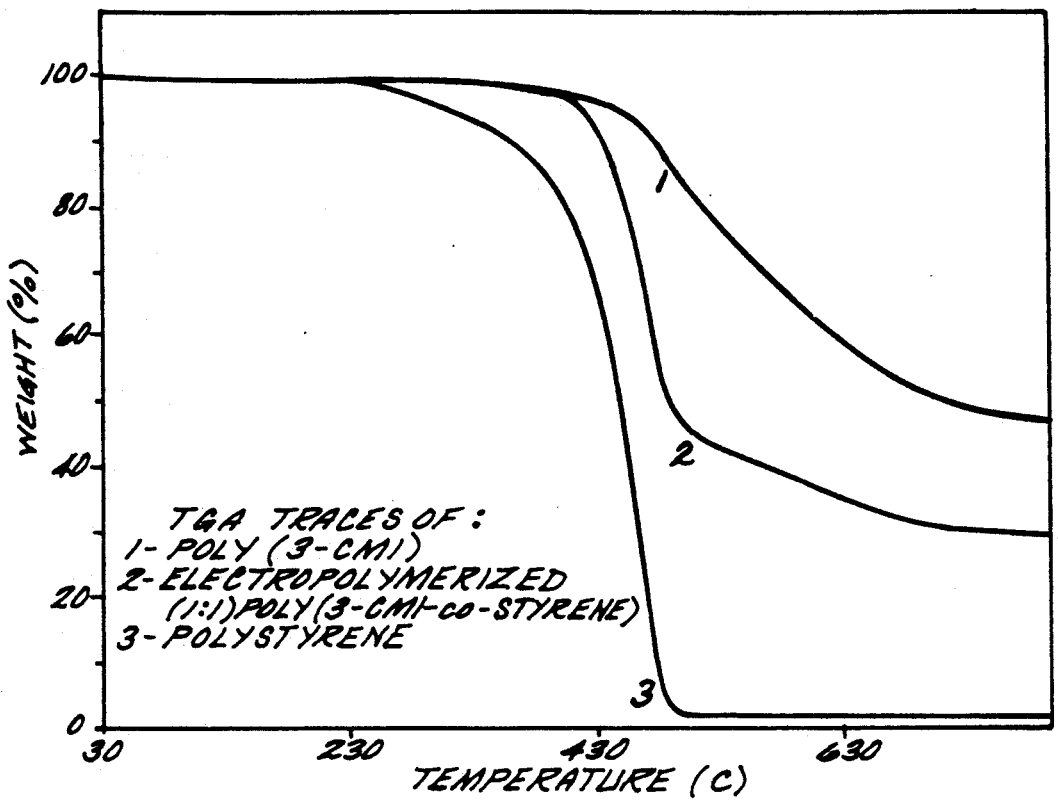
FIG. 5 are TGA traces of: (1) poly(3-CMI), (2) electropolymerized (1:1) poly(3-CMI-co-Styrene), (3) polystyrene.

Thermogravimetric analysis thermograms of solution cast polystyrene, bulk polymerized 3-CMI, and the electropolymerized (1:1) copolymer are shown on FIG. 5. These thermograms shown the electrocopolymers as having thermal stability intermediate between bulk homopolymerized poly-3-CMI and polystyrene. As expected, the data further shows that the thermal stability of the copolymers does not vary appreciably with changing monomer feed composition (Table 2). The electropolymerized samples demonstrate equivalent stability to the more stable epoxy resin systems and state-of-the-art formulated poly(bismaleimides).

The impact strength measured per cross sectional area at notch section is shown in Table 3. the high impact strength of the composite, 210 $KJ/m^2$ is attributed to the characteristic toughness of the thermoplastic matrix which prevented catastrophic breakage of the composites.

The interlaminar shear strength of the composites is also shown in Table 3. Moderate to good short beam shear strength of about 60 MPa was obtained for the samples. These are comparable to epoxy resin controls.

TABLE 1

GLASS TRANSITION TEMPERATURE OF STYRENE/3-CMI (SMAB) COPOLYMERS

| Sample | Mole % styrene (feed) | Tg (°C.) |
|---|---|---|
| SMAB-1 | 40 | 216 |
| SMAB-2 | 50 | 210 |
| SMAB-3 | 60 | 223 |
| SMAB-4 | 67 | 222 |
| SMAB-5 | 70 | 195 |
| SMAB-6 | 82 | 206 |
| SMAB-7 | 94 | 196 |
| Polystyrene | 100 | 100 |

TABLE 2

THERMAL STABILITY OF COPOLYMERS FROM THERMOGRAVIMETRIC ANALYSIS IN NITROGEN

| Feed (mol % styrene) | Initial Decomp. | Final Decomp. |
|---|---|---|
| 20 | 432 | 511 |
| 30 | 435 | 519 |
| 50 | 431 | 519 |
| 60 | 432 | 525 |
| 70 | 409 | 526 |
| 80 | 426 | 521 |

TABLE 3

MECHANICAL PROPERTIES OF THE COMPOSITES

| Comonomer Feed Ratio (3-CMI/Styrene) % | Impact Strength $KJ/m^2$ | Interlaminar Shear Strength MPa |
|---|---|---|
| 30/70 | 213 | 60 |
| 40/60 | 228 | 56 |
| 50/50 | 237 | 53 |
| 60/40 | 192 | 63 |
| 70/30 | 219 | 59 |

Effect of Reaction Conditions

Figure 6:
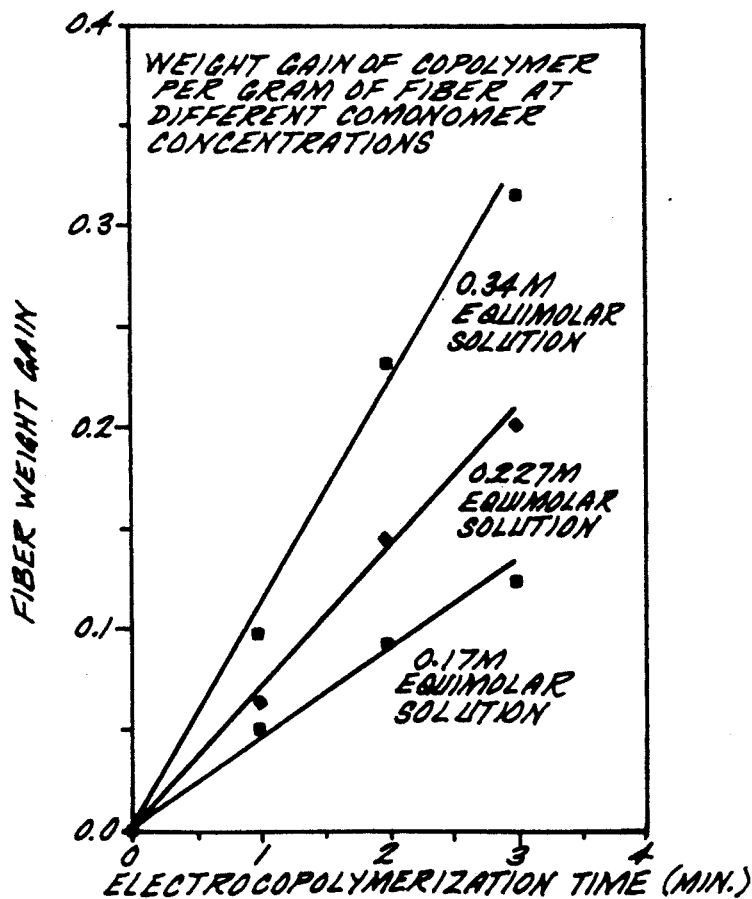
FIG. 6 is a graph showing weight gain of copolymer per gram of fiber at different comonomer concentrations.
Figure 7:
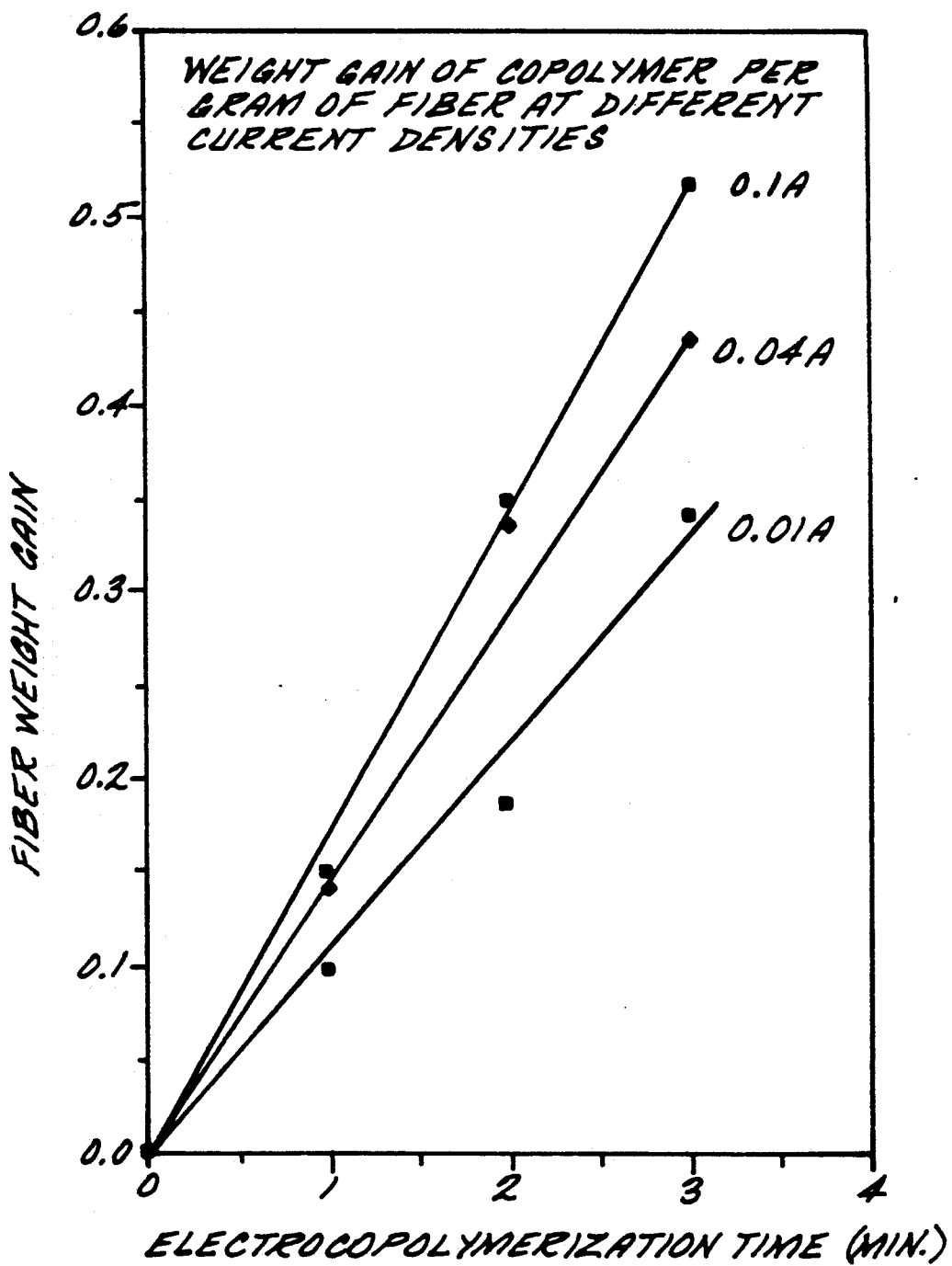
FIG. 7 is a graph showing weight gain of copolymer per gram of fiber at different current densities.

The amount of copolymer coating was studied as a function of current density, time, comonomer concentration and comonomer feed composition. A strong dependence of the amount of copolymer formed on the initial comonomer concentration as a function of time is shown in FIG. 6. In the same manner, the quantity of copolymer coatings formed on the fiber as a function of time at fixed initial comonomer concentration increases with increasing current density (FIG. 7). Variations of comonomer feed composition were found to have no significant effect upon the rate of copolymer formation. As is clear from FIGS. 6 and 7, the weight of the copolymer formed on the electrode increased linearly with time of polymerization. By changing the concentration of the comonomers, but maintaining the same comonomer feed composition the weight gain can be varied. A weight gain of about 30-40% of the copolymer per unit weight of the fiber was obtained (approximately 3 micron thick coating was used for composite fabrication; this corresponded to about 60 volume percent fibers in the final composite).

The foregoing Example 1 thus demonstrated a process of forming thick thermoplastic poly-3-carboxylphenylmaleimide-co-styrene matrices onto graphite fibers by electrochemical copolymerization. The glass transition temperature and the thermal decomposition temperature as well as the electropolymerizability of the copolymers were relatively the same for different comonomer feed composition, implying alternating copolymer structure. This is consistent with solution copolymerization data. The composite panels showed very good impact strength (approximately 210 KJ/m$^2$). The short beam shear strength (approximately 60 MPa) was comparable to epoxy/graphite controls.

EXAMPLE 2

While the styrene/maleimide data of Example 1 was based on a batch electropolymerization system, the following Example 2 describes the electropolymerization of a glycidyl acrylate/methyl acrylate copolymer composite from a continuous process.

Experimental

Methyl acrylate, glycidyl acrylate, and sulfuric acid were prepared and a continuous electropolymerization process was set up as described in Bell et al, *Polymer Composites* 8 (1), 46-52 (1987). The comonomer system, of 2 liters, contained 0.25 M Methyl Acrylate, 0.064 M Glycidyl Acrylate, and 0.025 M Sulfuric Acid in water.

Two anodes (titanium oxide coated with indium oxide, Area 2×200 cm$^2$) were used as counter electrodes, and a roving of AS-4 (Hercules Fibers Co., 3000 filaments) graphite fiber, with approximately 36 cm in the solution, was used as the working electrode, i.e., the cathode.

After removing oxygen from the monomer solution by purging with nitrogen for 30 min, polymerization was started by applying a constant direct current. The weight gain on the graphite fibers as they passed through the bath was measured by the method of thermal gravimetric analysis (TGA).

Results

Figure 8:
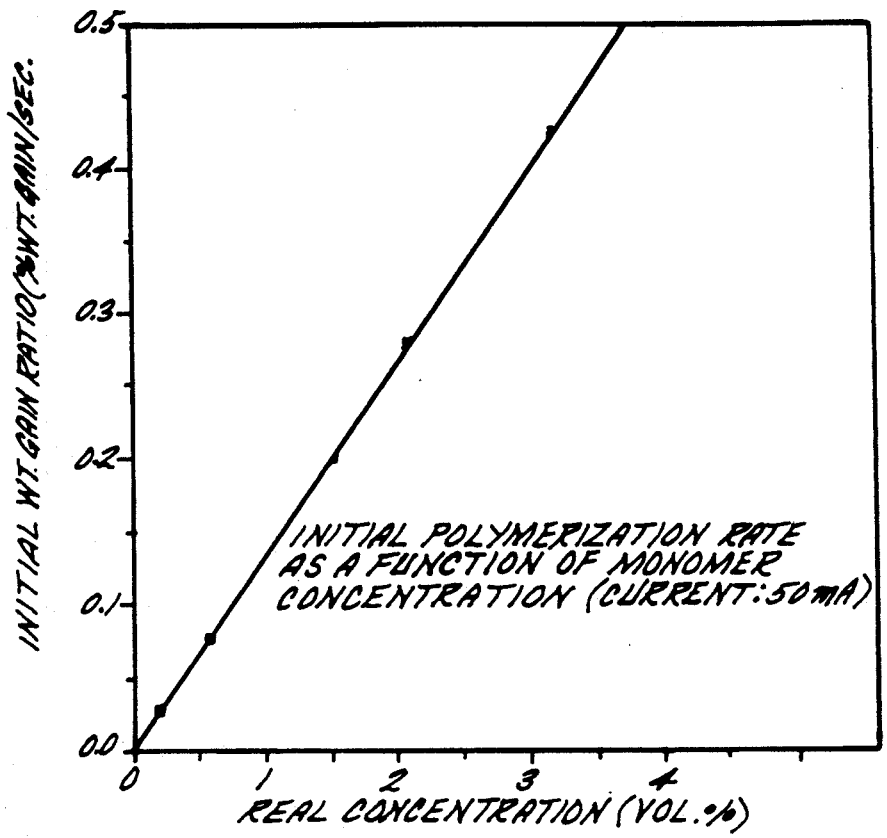
FIG. 8 is a graph showing polymerization rate as a function of monomer concentration for glycidyl acrylate/methyl acrylate (GA/MA) copolymers.

The effect of solution monomer concentration on initial polymerization rate (first 30 seconds) is shown in FIG. 8 for 50 milliamperes cell current. The linear plot is consistent with solution free radical polymerization theory, in which Rp, the rate of polymerization, is roughly proportional to monomer concentration.

Figure 9:
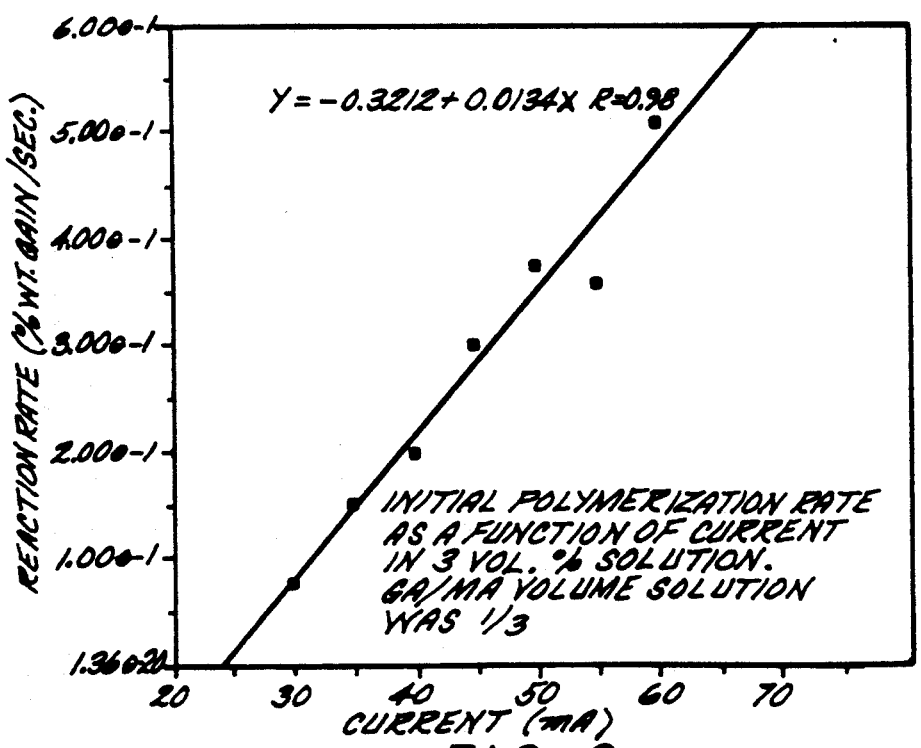
FIG. 9 is a graph showing polymerization rate as a function of current for GA/MA copolymers.

The effect of cell current on the initial polymerization rate is shown in FIG. 9. Linearity is again observed. The data are for a monomer solution containing 3 vol. % monomers, ⅓ GA/MA volume ratio. It will be appreciated that at longer polymerization time (i.e. 50-300 sec), linearity disappears. Diffusion beings to play a greater role as the coating becomes thicker, though monomer concentration remained constant.

From these observations:

$$R_p = K[m][A]$$

for the initial rate of polymerization, where Rp is the rate of polymerization, % wt gain/sec; [m] is the monomer concentration, and [A] is the cell current in milliamperes.

At longer reaction times it was found that $$R_p = K'[m][\text{time}]^{-0.4}$$

where K' is another constant.

EXAMPLES 3-13

A variety of other monomers and co-monomers have been electropolymerized using a batch process similar to that described in Example 1. The monomers utilized are described in Table 4 while the results of these electropolymerizations are summarized in Table 5.

TABLE 4

| Monomer | Structure |
| --- | --- |
| A Hydroxymethyl-Methacrylate | $H_2C=C(CH_3)-C(=O)-O-C_2H_4OH$ |
| B Vinyl Carbazole | $H_2C=CH$—N-carbazolyl |
| C Maleimide | maleimide (N-H) |
| D N-ethylmaleimide | maleimide (N-$C_2H_5$) |
| E Substituted N-Phenyl Maleimide | N-phenyl maleimide where R = COOH |
| F Styrene | $CH_2=CH$—phenyl |

TABLE 5

| Example | Monomers | Nature | Tg(°C.) | T$_{ID}$(°C.) |
| --- | --- | --- | --- | --- |
| 3 | A | — | 115 | ~350 |
| 4 | B | — | 245 | ≧450 |

TABLE 5-continued

| Example | Monomers | Nature | Tg(°C.) | $T_{ID}$(°C.) |
|---|---|---|---|---|
| 5 | C | — | ≧259 | ≧450 |
| 6 | D | — | ≦200 | ≧400 |
| 7 | E | — | ≧259 | ≧450 |
| 8 | F | — | 100 | ≧350 |
| 9 | A & B | Block | Range | — |
| 10 | A & E | Block/Random | 150–175 | — |
| 11 | C & F | Alternating | ≧220 | — |
| 12 | D & F | Alternating/random | ≧160 | — |
| 13 | E & F | Alternating | ≧200 | — |

All of the copolymers of Examples 9–13 provide excellent electropolymerization results with comonomers A and F greatly facilitating the reaction. Of the monomer Examples 3–8, Example 3 exhibited the best performance in terms of the rate and overall thickness of the layer formed. The remaining monomers reacted more slowly with the monomers of Examples 5 and 7 forming a powdery layer. It will be appreciated that $T_{ID}$ indicates the temperature of initial decomposition.

While sulfuric acid is the preferred electrolyte used in the 3-CMI/styrene system of Example 1, as mentioned, other electrolytes may be used depending on the thermoplastic system being polymerized onto the conductive material.

In monomer E of Table 4, R may also equal methyl or other alkyl, ester, C≡N, $NO_2$, alkylaryl or an aryl group.

While the prepreg made in accordance with the present invention is primarily composed of a thermoplastic, preferably the prepreg includes a small amount of crosslinkable (e.g. bifunctional) thermoset resin. In this way, during the final high temperature molding step, some limited crosslinking is effected in the final composite.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process of forming a thermoplastic polymer matrix prepreg composite consisting essentially of the steps of:
electropolymerizing at least one carboxy group containing monomer onto electrically conductive filler material in a substantially aqueous solution having a monomer concentration and over a time period effective to form a coating of thermoplastic polymer matrix on said filler material, said coating having a thickness of greater than two microns or a thickness effective to provide at least about 30 weight percent of thermoplastic polymer coating per unit weight of conductive filler material, said aqueous solution including at least one organic solvent, said at least one monomer being moderately soluble in said organic-containing aqueous solution and being permeable to ions diffusing as a result of said electropolymerization step.

2. The process of claim 1 wherein:
said conductive material comprises graphite.

3. The process of claim 1 wherein:
said conductive material comprises at least one bundle of graphite fibers.

4. The process of claim 1 wherein:
said thermoplastic matrix comprises a co-polymer of styrene and 3-carboxyphenyl maleimide.

5. The process of claim 4 wherein:
said co-polymer has the structure of

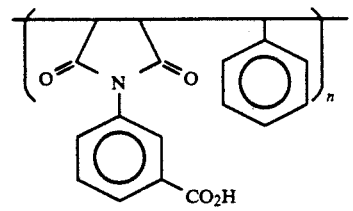

where n is at least 25.

6. The process of claim 2 wherein:
said thermoplastic matrix comprises a co-polymer of styrene and 3-carboxyphenyl maleimide.

7. The process of claim 6 wherein:
said co-polymer has the structure of

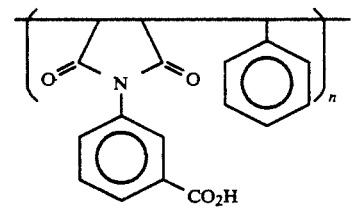

where n is at least 25.

8. The process of claim 1 wherein:
said thermoplastic matrix comprises a co-polymer of glycidyl acrylate and methyl acrylate, a copolymer of hydroxyethylmethacrylate and vinyl carbazole, a copolymer of hydroxethylmethacrylate and 3-carboxyhenyl maleimide, a copolymer of maleimide and styrene of a copolymer of N-ethylmaleimide and styrene.

9. The process of claim 2 wherein:
said thermoplastic matrix comprises a polymer of hydroxymethylmethacrylate, vinyl carbazole, maleimide, N-ethylmaleimide, 3-carboxyphenyl maleimide or styrene.

10. The process of claim 1 wherein said organic solvent comprises at least one dimethylacetamide, dimethylsulfoxide, tetrahydrofuran or dimethylformamide.

11. The process of claim 1, wherein the thermoplastic polymer coating exhibits a glass transition temperature of greater than 150° C.

* * * * *